Patented Apr. 25, 1944

2,347,621

UNITED STATES PATENT OFFICE 2,347,621

PROCESS FOR REDUCTION OF NITRO HYDROXY COMPOUNDS

John B. Tindall, Terre Haute, Ind., assignor to Commercial Solvents Corporation, Terre Haute, Ind., a corporation of Maryland No Drawing. Application July 12, 1941, Serial No. 402,232

4 Claims. (Cl. 260—584)

The present invention relates to an improved method for the prepaartion of amino hydroxy compounds. More specifically, it pertains to the catalytic liquid phase hydrogenation of mono- and polyhydric nitro compounds in the Raney nickel and a lower aliphatic acid to produce the corresponding amino hydroxy derivatives.

Prior methods for reducing nitro hydroxy compounds of the type contemplated by the present invention, have been concerned with the reduction of said nitro hydroxy compounds in the absence of any acidic substance whatsoever, or in the presence of carbon dioxide. Processes involving the reduction of nitro hydroxy compounds in the absence of any acidic substance whatsover, are highly uneconomical for the reason that as the reduction proceeds, the reaction medium becomes increasingly basic, thus tending to decompose the nitro hydroxy compound into the nitroparaffin and aldehyde, from which said nitro hydroxy compound was produced. Under such conditions, highly complex matcrials are formed, which in addition to greatly diminishing the yield of the desired nitro hydroxy compound, render the purification of the latter substance extremely difficult.

Procedures which employ carbon dioxide as a means of controlling the alkalinity of the reaction medium, have been found to be satisfactory for reductions which may be carried out at relatively low temperatures. Nitro hydroxy compounds which require higher temperatures for reduction, however, cannot be satisfactorily converted into the corresponding amino derivative in yields which are commercially practicable, since at elevated temperatures the carbonates of amino hydroxy compounds of the type contemplated by the present invention are relatively unstable, tending under such conditions to decompose into carbon dioxide and the free amino hydroxy compound, which in turn results in bringing about the same undesirable alkaline conditions that are present when the reduction is carried out in the absence of any acidic material.

I have now discovered that by effecting the hydrogenation of such nitro hydroxy compounds in the presence of Raney nickel and a lower aliphatic acid, greatly improved yields of the corresponding amino hydroxy compounds are obtainable. The lower aliphatic acid serves as a neutralizing agent for the basic amino hydroxy compound as it is formed, thus resulting in the production of the lower aliphatic acid salt of the said amino hydroxy compound. The resulting solution never becomes sufficiently basic to interfere with the ultimate yield of the amino hydroxy compound, since the extent to which decomposition of the lower aliphatic acid salt of said amino hydroxy compound occurs, is negligible, if at all. In this connection, the quantity of lower aliphatic acid utilized should be at least equivalent to the molecular quantity of nitro hydroxy compound present, and in some cases it may be desirable to use a slight excess of the former.

In reducing nitro hydroxy compounds according to my invention, I prefer to introduce the desired nitro hydroxy compound, Raney nickel catalyst, and a suitable lower aliphatic acid into a hydrogenation apparatus with or without a solvent, such as methyl alcohol, ethyl alcohol, or water. The hydrogenation apparatus employed may be any one of several types. For example, I have found that the Adkins type pressure hydrogenation apparatus serves very satisfactorily for this purpose. The latter device comprises a cylindrical reaction vessel fitted with flexible tubing for the introduction of hydrogen under pressure. The apparatus may be equipped with an electrical heating coil in order that the hydrogenation may be carried out at elevated temperatures, if desired.

The so-called Raney nickel catalyst has several important advantages, Raney nickel is a catalyst prepared as described in U. S. Patents 1,563,587; 1,628,190; and 1,915,473, issued to Murray Raney, which process in general involves the preparation of an alloy of nickel with some other metal and subsequent leaching out of the non-nickel metal whereby the catalytic material remains in finely divided condition. This catalyst has been found to be active at temperatures as low as approximately 25° C., and may be used in numerous hydrogenation runs before its activity becomes appreciably impaired.

The conditions under which the amino hydroxy compounds of my invention may be prepared, will be found to vary within wide limits. For example, hydrogenation may be effectively carried out at pressures ranging from slightly in excess of atmospheric pressure to pressures of from 1500–2000 pounds per square inch, whereas the temperature employed may vary from about 35° C. up to a temperature which is slightly below the decomposition temperature of the aliphatic acid salts of said amino hydroxy compounds. With regard to optimum conditions of temperature and pressure, however, I have found it desirable to carry out the hydrogenation reaction at temperatures of from approximately 65–85° C., and at a hydrogen pressure of approximately 1000 pounds per square inch. The rate of hydrogenation is ordinarily found to be directly influenced by the temperature utilized, as well as by the type of catalyst employed, and the extent of agitation of the reaction mixture. Consequently, therefore, if any of the above conditions is materially altered, a corresponding adjustment of other conditions is usually required in order to obtain consistently high yields of the desired amino hydroxy compound. For example, lower temperatures will ordinarily require a longer reaction period, and, conversely, higher temperatures usually necessitate a shorter time for the reaction. Excessively high temperatures in general, however, are to be avoided when short reaction periods are employed, since I have found that under such conditions inferior yields of the amino hydroxy compounds are obtained.

When carrying out the reaction in accordance with the preferred conditions described above, hydrogenation is usually found to be complete after a period of from one to two hours. Optimum conditions in regard to time, temperature, extent of agitation, pressure and catalyst in any given instance, however, may readily be determined by simple experiment.

Upon completion of the reduction step, the catalyst is removed from the reaction mixture by filtration or any other convenient means, and the filtrate distilled to remove the solvent present. A quantity of water equivalent to approximately one-third of the volume of solvent employed, is then added to the residue, after which said residue is extracted with several portions of a suitable solvent, the choice of the latter, of course, being dependent upon the ability of such solvent to substantially completely remove the non-basic impurities contained in the crude mixture without extracting simultaneously appreciable quantities of the amino hydroxy compound. A 50 per cent sodium hydroxide solution is next added in amounts slightly in excess of the aliphatic acid employed. By means of the addition of alkali, the amino hydroxy compound is set free from its salt, and is generally observed to rise to the surface of the mixture in the form of an oil.

In certain instances it will be found necessary to modify the above procedure of isolation, the extent to which such methods are varied being dependent upon the particular aliphatic acid employed. If the aliphatic acid utilized is substantially insoluble in water, it may be readily separated from the reaction mixture by first adding to said mixture a quantity of a mineral acid, such as hydrochloric or sulfuric acids, in slight excess of the amount required to combine with the amino hydroxy compound, to form the corresponding salt thereof, the latter generally being water soluble. The substantially water-insoluble aliphatic acid is then separated from the aqueous mineral acid salt solution by either layer separation or by extraction with a suitable solvent. Any such carboxylic acid which remains after this treatment, may be completely removed by means of steam distillation. After the interfering carboxylic acid has thus been removed, the amino hydroxy compound is liberated from its mineral acid salt by treatment with a solution of a base, preferably sodium hydroxide, as described above.

The readily water-soluble lower aliphatic acids, such as formic and acetic acids, are generally found to be difficult to separate from the aqueous amino hydroxy salt solution, and therefore cannot ordinarily be effectively separated from such aqueous solutions by the above method. Such aliphatic acids, however, may be conveniently removed from the crude reaction mixture by distilling off said acids in the form of their methyl or ethyl esters, after liberation thereof from the amino hydroxy compound by means of mineral acid. After the lower aliphatic acid is removed in this manner, separation of the amino hydroxy compound from its mineral acid salt is accomplished by means of treatment with alkali, as mentioned above. Upon the addition of the strong alkali solution, the amino hydroxy compound is liberated from its salt, as may ordinarily be evidenced by the formation of two layers, the upper layer consisting principally of the free amino hydroxy compound. The layer containing the amino hydroxy compound is then separated and the water layer extracted several times with a suitable solvent, such as ether. These extracts are then combined with the original layer, and the more volatile constituents of the resulting mixture are distilled off at a pressure of from 60–85 mm. The residual material is then distilled at considerably reduced pressures, i. e., 1–2 mm., and the amino hydroxy compound is collected. The product thus obtained may be further purified by treatment with a suitable acid to form the corresponding salt, followed by repeated extraction of the resulting aqueous salt solution with a suitable solvent such as, for example, ether, benzene, butanol, etc., after which the raffinate is treated with sufficient alkali to regenerate the free amino hydroxy compound which rises to the surface in the form of an oil. The oil layer is then separated, the water layer extracted with several portions of ether, after which these extracts and the oil layer are combined and fractionated under vacuum, in accordance with known methods.

The nitro hydroxy compounds used in carrying out my invention, may be prepared by any of the known methods. For example, such compounds may be satisfactorily prepared by the procedure described in U. S. Pat. No. 2,135,444, by B. M. Vanderbilt, which comprises reacting a primary or secondary nitroparaffin with an aldehyde under suitably controlled conditions, in the presence of a common solvent, if desired, such as ethyl alcohol, and in the presence of an alkaline catalyst, for example, sodium hydroxide, the aldehyde being slowly added to a solution of nitroparaffin and catalyst in the solvent, if employed, with thorough agitation. In carrying out such reaction, the proportions of reactants utilized will depend upon the type of nitroparaffin employed, and the product desired. For example, in preparing a nitro alcohol, theoretically one mole of aldehyde should be used per mole of nitroparaffin, and this will be found to be satisfactory in the case of secondary nitroparaffins, since a nitro alcohol is the only possible product. When employing primary nitroparaffins, however, nitro alcohols and nitro glycols are produced in an equilibrium mixture, and in such instances it is therefore desirable to utilize an excess of nitroparaffin if a nitro alcohol is the product desired. Conversely, if a nitro glycol is desired, at least two moles of the aldehyde per mole of nitroparaffin should be employed.

As examples of specific nitro hydroxy compounds which may be reduced to the corresponding amino derivatives in accordance with the present invention, there may be mentioned 1- nitro - 2-butanol, 2-nitro-2-methyl-1-propanol, 2 - nitro-1-phenyl-1-propanol, 2-nitro-1-phenyl-1-butanol, 2-nitro-2-methyl-1,3-propanediol, 2-nitro-1,3-propanediol, and the like.

Suitable lower aliphatic acids which may be utilized in accordance with the present invention, are formic, acetic, propionic, butyric and valeric acids, that is, monobasic aliphatic acids having from 1 to 5 carbon atoms.

The examples which follow are representative of the amino hydroxy compounds, as well as the aliphatic acids which may be utilized in carrying out the present invention. However, it is to be understood that these examples are merely illustrative, and do not in any way limit the scope of my invention, since I have found that the general class of compounds herein described may be reduced to the corresponding amino derivatives in accordance with the procedure outlined above.

Example I

Into a hydrogenation apparatus of the Adkins type was introduced 194 parts of 2-nitro-2,4-dimethyl-3-pentanol, 72 parts of acetic acid, 600 parts of methyl alcohol, and 20 parts of Raney nickel catalyst. Hydrogen was then introduced into the apparatus, and the hydrogen pressure maintained at 1000 pounds per square inch. The apparatus was constantly agitated during hydrogenation, which took place at approximately 60-70° C., and after the reaction was found to be substantially complete, the mixture was withdrawn from the apparatus, and filtered to remove the catalyst. The filtrate was then distilled at atmospheric pressure to remove the methyl alcohol, after which 200 parts of water was added to the residue. This mixture was next extracted with 50-part portions of ether until the extract was clear, denoting the absence of non-basic impurities in the raffinate. A 50 per cent sodium hydroxide solution was then added in an amount slightly in excess of the acetic acid employed. Upon addition of the alkali, the crude 2-amino-2,4-dimethyl-3-pentanol was liberated and rose to the top of the mixture in the form of an oil. This oil layer was then separated, and the water layer extracted with several portions of ether, after which these extracts were combined with the original oil layer, and distilled at 60 mm. up to a liquid temperature of 100° C. The still residue was then fractionated at 2 mm. until substantially all of the volatile matter therein had been removed. The distillate thus obtained was again fractionated through a packed column at 15 mm. pressure. This distillate was then dissolved in aqueous hydrochloric acid, and repeatedly extracted with ether, after which a solution of sodium hydroxide was added thereto, liberating the free amino alcohol from its salt. The oil layer thus obtained, and which consisted principally of 2-amino-2,4-dimethyl-3-pentanol, was dried over solid sodium hydroxide, and distilled. The fraction boiling at 79° C. (15 mm.) consisting of substantially pure 2-amino-2,4-dimethyl-3-pentanol, was then collected.

Example II

A mixture consisting of 440 parts of crude 1-nitro-2-butanol, 145 parts of formic acid, 340 parts of methanol, and 15 parts of Raney nickel catalyst, was subjected to hydrogenation in accordance with the procedure described in Example I. At the conclusion of the hydrogenation, the charge was removed from the apparatus and filtered, after which 175 parts of sulfuric acid was added to the filtrate, and the resulting acidified solution distilled to remove the formic acid as methyl formate, as well as the excess methanol. The non-basic impurities contained in the still residue were extracted with three 150-part portions of benzene, followed by extraction with approximately 71 parts of ether. After separation, the water layer was treated with 150 parts of sodium hydroxide which was dissolved in a minimum volume of water. The resulting alkaline solution was then agitated thoroughly, during which time the mixture separated into two distinct layers, the upper layer consisting principally of crude 1-amino-2-butanol, which was separated. The lower aqueous layer was next extracted with two 100-part portions of butanol, and the extracts combined with the original oil layer, and fractionated. The first stage of the distillation was carried out at atmospheric pressure up to a temperature of 120° C., in order to remove the butanol and any other volatile impurities which might be present. The portion remaining in the still was then further fractionated at 2-mm., at which pressure substantially pure 1-amino-2-butanol was collected at 45° C.

Example III

A mixture consisting of 254 parts of 2-nitro-1-phenyl-1-propanol, 600 parts of methanol, 90 parts of acetic acid, and 7 parts of Raney nickel catalyst, was reduced with molecular hydrogen under conditions similar to those set forth in Example I. At the conclusion of the reduction, the charge was removed from the hydrogenation apparatus, and filtered. The filtrate was then distilled at atmospheric pressure up to a temperature of 80° C. to remove the methanol present. The still residue was next extracted with a 100-part portion of a 50-50 mixture of benzene and butanol, in order to remove non-basic impurities from the crude reduction product. After considerable agitation, the resulting mixture was allowed to settle, and the upper benzene-butanol layer discarded. To the aqueous solution of the phenyl amino propanol acetate (salt) was added 60 parts of sodium hydroxide in the form of a 50 per cent solution. This treatment resulted in the formation of two separate layers. The upper layer, containing principally free phenyl amino propanol, was separated and distilled under reduced pressure (60-70 mm.) up to a temperature of 100° C. At this point the pressure was further reduced (1-2 mm.), and substantially pure phenyl amino propanol was collected at 125° C.

Example IV

An initial mixture consisting of 300 parts of 3-nitro-2-butanol, 222 parts of butyric acid, 400 parts of water, and 20 parts of Raney nickel catalyst, was hydrogenated in accordance with the method described in Example I. After reduction appeared to be complete, the reaction mixture was filtered to remove the catalyst, and approximately 128 parts of sulfuric acid was added to the filtrate. After the acidified solution had been permitted to cool, it was extracted with four 100-part portions of ether in order to remove the butyric acid and any other non-basic impurities which might be present. To the resulting solution was added, with agitation, 100 parts of calcium hydroxide. This mixture was thoroughly agitated for one hour, and the calcium sulfate separated by filtration. The calcium sulfate residue was next washed with two 300-part portions of water, and the filtered washings combined with the original filtrate. This solution was then distilled to dryness under high vacuum, after which the resulting distillate was further fractionated at atmospheric pressure, 3-amino-2-butanol being collected at a temperature of 159° C.

It is to be understood, of course, that my invention is not to be construed as limited to the particular examples given above, since many variations will readily occur to those skilled in the art. The present invention may be suitably employed in the hydrogenation of any of the nitro hydroxy compounds, or other nitro compounds, being particularly useful in those cases wherein the nitro compound to be hydrogenated is unstable in basic solutions; for example, the nitro alcohols, the nitro glycols, and the nitro trihydroxy compounds.

Having now described my invention, what I claim is:

1. In the reduction of nitro compounds selected from the group consisting of saturated nitro hydroxy aliphatic alcohols and saturated aryl nitro hydroxy aliphatic alcohols to the corresponding amino compounds, the process which comprises subjecting such a nitro alcohol compound to the action of hydrogen at superatmospheric pressures at a temperature ranging from about 35 to 85° C. in the presence of a finely divided Raney nickel catalyst and a quantity of a monobasic aliphatic acid having from 1 to 5 carbon atoms in an amount which is at least equivalent to the molecular quantity of nitrohydroxy compound present.

2. The process of claim 1 wherein said aliphatic acid is acetic acid.

3. The process of claim 1 wherein said aliphatic acid is formic acid.

4. The process of claim 1 wherein said aliphatic acid is butyric acid.

JOHN B. TINDALL.